(12) United States Patent
Okpara et al.

(10) Patent No.: US 11,401,819 B2
(45) Date of Patent: Aug. 2, 2022

(54) TURBINE BLADE PLATFORM COOLING HOLES

(71) Applicant: Solar Turbines Incorporated, San Diego, CA (US)

(72) Inventors: Nnawuihe Asonye Okpara, San Diego, CA (US); Aaron J. Dick, Escondido, CA (US); Donald Joseph Bognatz, San Diego, CA (US); Marius Dumitrascu, San Diego, CA (US); Estevan Daniel Negrete, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 0 days.

(21) Appl. No.: 17/125,344

(22) Filed: Dec. 17, 2020

(65) Prior Publication Data
US 2022/0195873 A1 Jun. 23, 2022

(51) Int. Cl.
*F01D 5/18* (2006.01)
*F01D 5/30* (2006.01)

(52) U.S. Cl.
CPC ............... *F01D 5/186* (2013.01); *F01D 5/30* (2013.01); *F05D 2220/32* (2013.01); *F05D 2230/31* (2013.01); *F05D 2240/30* (2013.01); *F05D 2240/81* (2013.01); *F05D 2260/202* (2013.01)

(58) Field of Classification Search
CPC ........ F01D 5/186; F01D 5/30; F05D 2220/32; F05D 2240/81
See application file for complete search history.

(56) References Cited

U.S. PATENT DOCUMENTS

| | | | |
|---|---|---|---|
| 5,344,283 A * | 9/1994 | Magowan | F01D 5/187 415/115 |
| 5,639,216 A | 6/1997 | McLaurin et al. | |
| 5,848,876 A | 12/1998 | Tomita | |
| 6,071,075 A * | 6/2000 | Tomita | F01D 5/187 416/97 A |
| 6,190,130 B1 * | 2/2001 | Fukue | F01D 5/187 416/97 R |
| 7,144,215 B2 | 12/2006 | Keith et al. | |
| 7,600,972 B2 | 10/2009 | Benjamin et al. | |
| 7,819,629 B2 * | 10/2010 | Liang | F01D 5/187 416/97 R |

(Continued)

FOREIGN PATENT DOCUMENTS

| | | |
|---|---|---|
| EP | 3508696 | 7/2019 |
| JP | 2011236805 | 8/1999 |
| JP | 2014047786 A | 3/2014 |

OTHER PUBLICATIONS

Written Opinion and International Search Report for Int'l. Patent Appln. No. PCT/US2021/058879, dated Feb. 25, 2022 (10 pgs).

*Primary Examiner* — Eldon T Brockman
(74) *Attorney, Agent, or Firm* — Procopio, Cory, Hargreaves & Savitch LLP (57) ABSTRACT

During operation of a gas turbine engine, the turbine blades are subjected to extremely high temperatures. While internal cooling passages may be provided within the turbine blades to cool the airfoils, the platforms of the turbine blades also experience high temperatures. In an embodiment, cooling holes are provided in each platform to cool distressed locations in the platform and improve the durability of each turbine blade.

19 Claims, 9 Drawing Sheets

(56) References Cited

U.S. PATENT DOCUMENTS

| | | | |
|---|---|---|---|
| 8,206,114 B2 | 6/2012 | Spangler et al. | |
| 8,523,527 B2 * | 9/2013 | Lacy | F01D 5/187 |
| | | | 416/97 R |
| 8,579,590 B2 | 11/2013 | Nadvit et al. | |
| 8,628,300 B2 | 1/2014 | Boyer | |
| 8,636,470 B2 * | 1/2014 | Halfmann | F01D 5/3015 |
| | | | 416/97 R |
| 8,647,064 B2 | 2/2014 | Boyer | |
| 8,851,846 B2 | 10/2014 | Ellis et al. | |
| 8,870,525 B2 | 10/2014 | Walunj et al. | |
| 9,249,674 B2 | 2/2016 | Ellis et al. | |
| 9,624,779 B2 * | 4/2017 | Schick | F01D 5/187 |
| 10,156,150 B2 | 12/2018 | Chlus | |
| 10,180,067 B2 | 1/2019 | Beattie et al. | |
| 10,227,875 B2 | 3/2019 | Lewis et al. | |
| 10,718,219 B2 | 7/2020 | Meier et al. | |
| 11,174,745 B2 * | 11/2021 | Inomata | F01D 9/041 |
| 2009/0232660 A1 * | 9/2009 | Liang | F01D 5/187 |
| | | | 416/97 R |
| 2011/0223004 A1 * | 9/2011 | Lacy | F01D 5/187 |
| | | | 415/115 |
| 2012/0093649 A1 * | 4/2012 | Halfmann | F01D 5/082 |
| | | | 416/95 |
| 2015/0104322 A1 * | 4/2015 | Schick | F01D 5/187 |
| | | | 416/223 R |
| 2016/0177751 A1 | 6/2016 | Otomo et al. | |

* cited by examiner

TURBINE BLADE PLATFORM COOLING HOLES

TECHNICAL FIELD

The embodiments described herein are generally directed to a turbine blade, and, more particularly, to holes for cooling a platform of a gas turbine blade.

BACKGROUND

In a gas turbine engine or generator, the turbine blades, including their respective platforms, are subjected to extremely high gas temperatures. To reduce resultant metal temperatures to a level that satisfies service-life requirements, the airfoil of each turbine blade may comprise one or more internal cooling passages that circulate cooling air through the airfoil. The cooling air may flow from a cooling-air source that is radially inside a ring formed by the platforms of the turbine blades. The internal cooling passages in each turbine blade may extend through the platform to connect cooling passages within the airfoil to the cooling-air source.

However, this is insufficient to provide complete cooling to the platform. Thus, the platform of a turbine blade may still experience extremely high temperatures for prolonged periods of time, especially as the distance from the cooling passages increases. This can cause durability issues, such as cracking, low life hours or cycles, and/or the like.

U.S. Pat. No. 8,579,590 illustrates parallel cooling holes in a platform of a turbine blade. However, the location and configuration of the cooling holes fail to address one or more problems. The present disclosure is directed toward overcoming these problems discovered by the inventors.

SUMMARY

In an embodiment, a turbine blade is disclosed that comprises: an airfoil; a root; a platform between the airfoil and the root, wherein the platform has a leading edge region that extends upstream from the airfoil, a middle region from which the airfoil extends, and a trailing edge region that extends downstream from the airfoil; and one or more internal cooling passages extending from the root, through the platform, and into the airfoil; wherein the platform comprises at least one first cooling hole in a pressure-side surface of the middle region of the platform, wherein the at least one first cooling hole is in fluid communication with the one or more internal cooling passages, and wherein the at least one first cooling hole is linear, and wherein the platform comprises at least one second cooling hole in the trailing edge region of the platform, wherein the at least one second cooling hole is in fluid communication with a supply passage.

In an embodiment, a turbine blade is disclosed that comprises: an airfoil; a root; a platform between the airfoil and the root, wherein the platform has a leading edge region that extends upstream from the airfoil, a middle region from which the airfoil extends, and a trailing edge region that extends downstream from the airfoil; and one or more internal cooling passages extending from the root, through the platform, and into the airfoil; wherein the platform comprises at least two linear first cooling holes in a pressure-side surface of the middle region of the platform, wherein each of the at least two linear first cooling holes is in fluid communication with the one or more internal cooling passages, and wherein the platform comprises at least three linear second cooling holes in the trailing edge region of the platform, wherein each of the at least three linear second cooling holes is in fluid communication with a supply passage extending from the root to the platform, wherein a first one of the at least three linear second cooling holes is in the pressure-side surface of the trailing edge region of the platform, wherein a second one of the at least three linear second cooling holes is in a trailing edge surface of the trailing edge region of the platform, and wherein a third one of the at least three linear second cooling holes is in a suction-side surface of the trailing edge region of the platform.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

For clarity and ease of explanation, some surfaces and details may be omitted in the present description and figures. In addition, references herein to "upstream" and "downstream" or "forward" and "aft" are relative to the flow direction of the primary gas (e.g., air) used in the combustion process, unless specified otherwise. It should be understood that "upstream," "forward," and "leading" refer to a position that is closer to the source of the primary gas or a direction towards the source of the primary gas, and "downstream," "aft," and "trailing" refer to a position that is farther from the source of the primary gas or a direction that is away from the source of the primary gas. Thus, a trailing edge or end of a component (e.g., a turbine blade) is downstream from a leading edge or end of the same component. Also, it should be understood that, as used herein, the terms "side," "top," "bottom," "front," and "rear" are used for convenience of understanding to convey the relative positions of various components with respect to each other, and do not imply any specific orientation of those components in absolute terms (e.g., with respect to the external environment or the ground).

Figure 1:
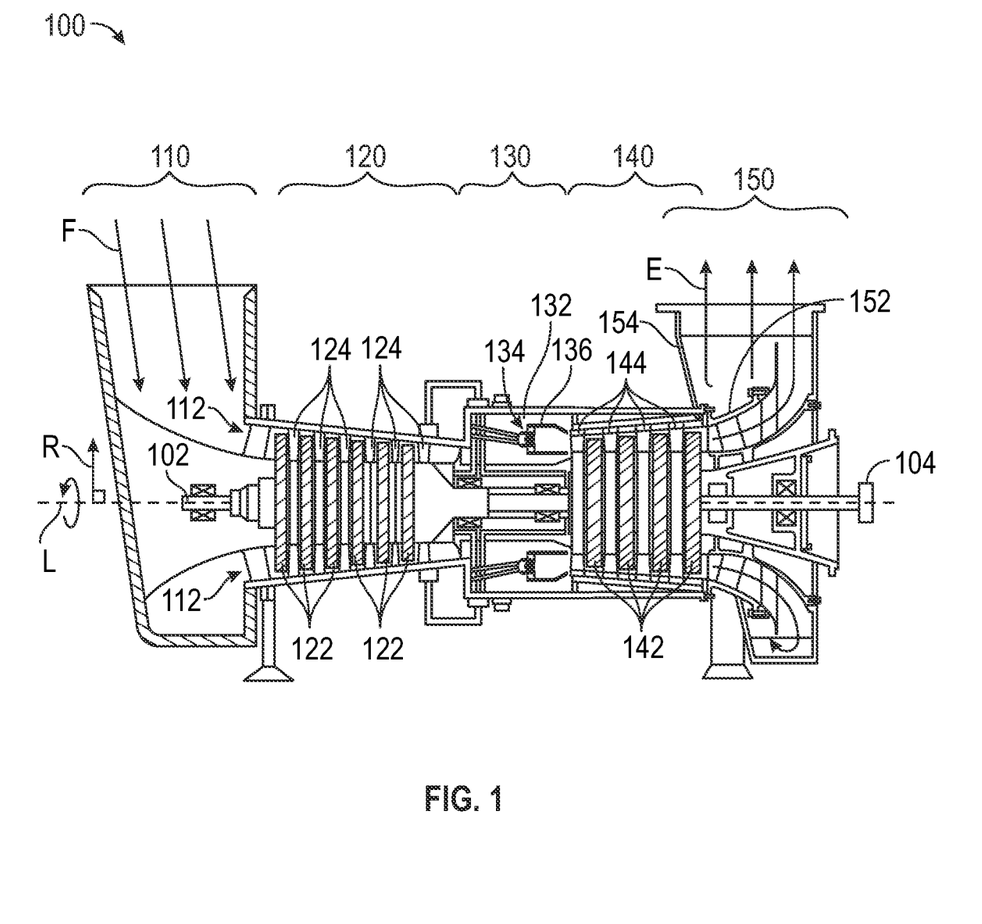
FIG. 1 illustrates a schematic diagram of a gas turbine engine, according to an embodiment.

FIG. 1 illustrates a schematic diagram of a gas turbine engine 100, according to an embodiment. Gas turbine engine 100 comprises a shaft 102 with a central longitudinal axis L. A number of other components of gas turbine engine 100 are concentric with longitudinal axis L and may be annular to longitudinal axis L. A radial axis may refer to any axis or direction that radiates outward from longitudinal axis L at a substantially orthogonal angle to longitudinal axis L, such as radial axis R in FIG. 1. As used herein, the term "axial" will refer to any axis or direction that is substantially parallel to longitudinal axis L.

In an embodiment, gas turbine engine 100 comprises, from an upstream end to a downstream end, an inlet 110, a compressor 120, a combustor 130, a turbine 140, and an exhaust outlet 150. In addition, the downstream end of gas turbine engine 100 may comprise a power output coupling 104. One or more, including potentially all, of these components of gas turbine engine 100 may be made from stainless steel and/or durable, high-temperature materials known as "superalloys." A superalloy is an alloy that exhibits excellent mechanical strength and creep resistance at high temperatures, good surface stability, and corrosion and oxidation resistance. Examples of superalloys include, without limitation, Hastelloy, Inconel, Waspaloy, Rene alloys, Haynes alloys, Incoloy, MP98T, TMS alloys, and CMSX single crystal alloys.

Inlet 110 may funnel a working fluid F (e.g., the primary gas, such as air) into an annular flow path 112 around longitudinal axis L. Working fluid F flows through inlet 110 into compressor 120. While working fluid F is illustrated as flowing into inlet 110 from a particular direction and at an angle that is substantially orthogonal to longitudinal axis L, it should be understood that inlet 110 may be configured to receive working fluid F from any direction and at any angle that is appropriate for the particular application of gas turbine engine 100. While working fluid F will primarily be described herein as air, it should be understood that working fluid F could comprise other fluids, including other gases.

Compressor 120 may comprise a series of compressor rotor assemblies 122 and stator assemblies 124. Each compressor rotor assembly 122 may comprise a rotor disk that is circumferentially populated with a plurality of rotor blades. The rotor blades in a rotor disk are separated, along the axial axis, from the rotor blades in an adjacent disk by a stator assembly 124. Compressor 120 compresses working fluid F through a series of stages corresponding to each compressor rotor assembly 122. The compressed working fluid F then flows from compressor 120 into combustor 130.

Combustor 130 may comprise a combustor case 132 that houses one or more, and generally a plurality of, fuel injectors 134. In an embodiment with a plurality of fuel injectors 134, fuel injectors 134 may be arranged circumferentially around longitudinal axis L within combustor case 132 at equidistant intervals. Combustor case 132 diffuses working fluid F, and fuel injector(s) 134 inject fuel into working fluid F. This injected fuel is ignited to produce a combustion reaction in one or more combustion chambers 136. The combusting fuel-gas mixture drives turbine 140.

Turbine 140 may comprise one or more turbine rotor assemblies 142 and stator assemblies 144 (e.g., nozzles). Each turbine rotor assembly 142 may correspond to one of a plurality or series of stages. Turbine 140 extracts energy from the combusting fuel-gas mixture as it passes through each stage. The energy extracted by turbine 140 may be transferred (e.g., to an external system) via power output coupling 104.

The exhaust E from turbine 140 may flow into exhaust outlet 150. Exhaust outlet 150 may comprise an exhaust diffuser 152, which diffuses exhaust E, and an exhaust collector 154 which collects, redirects, and outputs exhaust E. It should be understood that exhaust E, output by exhaust collector 154, may be further processed, for example, to reduce harmful emissions, recover heat, and/or the like. In addition, while exhaust E is illustrated as flowing out of exhaust outlet 150 in a specific direction and at an angle that is substantially orthogonal to longitudinal axis L, it should be understood that exhaust outlet 150 may be configured to output exhaust E towards any direction and at any angle that is appropriate for the particular application of gas turbine engine 100.

Figure 2:
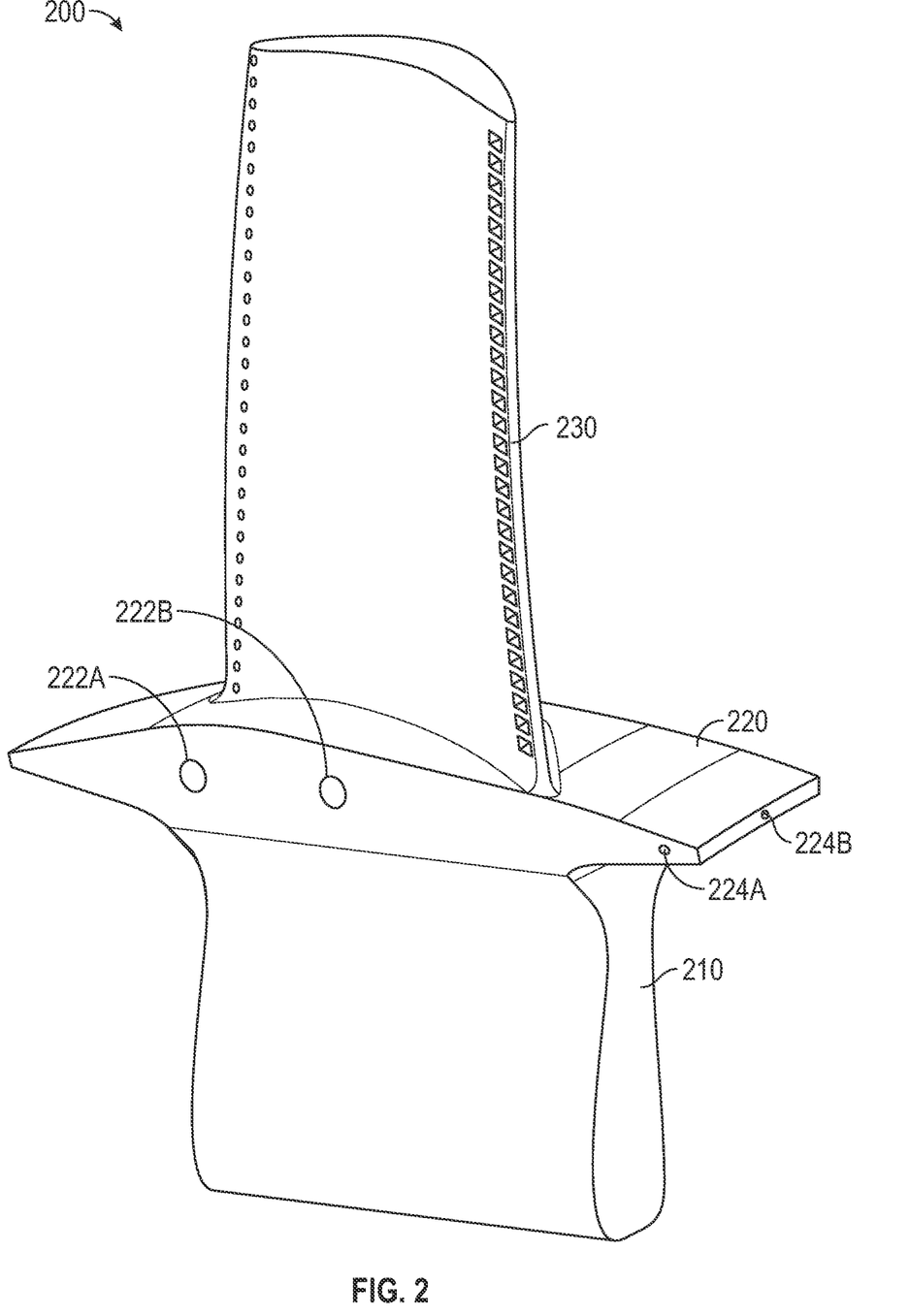
FIG. 2 illustrates a perspective view of a turbine blade, according to an embodiment.

FIG. 2 illustrates a perspective view of a turbine blade 200, according to an embodiment. Turbine blade 200 comprises a root 210 (e.g., comprising a "fir tree," "bulb," or "dovetail" shape), a platform 220, and an airfoil 230. Each turbine rotor assembly 142 may comprise a plurality of turbine blades 200 arranged annularly around longitudinal axis L, with the platform 220 of each turbine blade 200 abutting the platform 220 of adjacent turbine blades on both long sides, and each airfoil 230 extending from platform 220 along a radial axis R or a near-radial axis. The turbine rotor assembly 142 comprising turbine blades 200 may be positioned in any one or more stages of turbine 140. In an embodiment, turbine blades 200 are comprised in a turbine rotor assembly 142 that is in at least the first stage of turbine 140.

For consistency, in all of the figures, the upstream or forward end of turbine blade 200 (e.g., including the leading edge of airfoil 230) is shown on the left, and the downstream or aft end of turbine blade 200 (e.g., including the trailing edge of airfoil 230) is shown on the right. It should be understood that, in this orientation, the pressure side of airfoil 230 is in front in each figure, and the suction side of airfoil 230 is in the rear in each figure.

Platform 220 comprises a leading edge region that extends upstream from airfoil 230, a middle region from which airfoil 230 extends, and a trailing edge region that extends downstream from airfoil 230. In an embodiment, platform 220 comprises one or more cooling holes 222 and/or 224 in one or more side surfaces of platform 220. For example, in the illustrated embodiment, two cooling holes 222A and 222B are provided in the pressure-side surface of the middle region of platform 220, a cooling hole 224A is provided in the pressure-side surface of the trailing edge region of platform 220, a cooling hole 224B is provided in the trailing edge surface of platform 220, and a cooling hole 224C (shown in FIGS. 4 and 6) is provided in the suction-side surface of the trailing edge region of platform 220. However, it should be understood that a different number and/or arrangement of cooling holes 222 may be provided in the pressure-side surface of platform 220 and/or a different number and/or arrangement of cooling holes 224 may be provided in the trailing edge region of platform 220. In addition, although not shown, one or more cooling holes 222 may be provided in the suction-side surface of platform 220 and/or in the leading edge region on one or both of the pressure-side and suction-side surfaces of platform 220. In general, a cooling hole 222 and/or 224 may be provided anywhere in platform 220 which would benefit from reduced metal temperatures. In other words, a cooling hole 222/224 may be directed precisely at any distressed location in platform 220 to provide effective cooling to that location.

It should be understood that in some embodiments, when a plurality of turbine blades 200 are arranged in a turbine rotor assembly 142 in turbine 140, cooling holes 222/224 may be at least partially blocked. For example, cooling holes 222A, 222B, 224A, and 224C in a given platform 220 of a turbine blade 200 may be blocked by a platform 220 of an adjacent turbine blade 220 or other component. In addition, cooling hole 224B may be blocked by a downstream component of turbine 140 that abuts the trailing edge of platform 220. However, in an embodiment, cooling air may still flow out of cooling holes 222 and/or 224 through gaps between platform 220 and the adjacent components. Thus, in an embodiment, cooling holes 222/224 are only partially or incidentally blocked.

Figure 3:
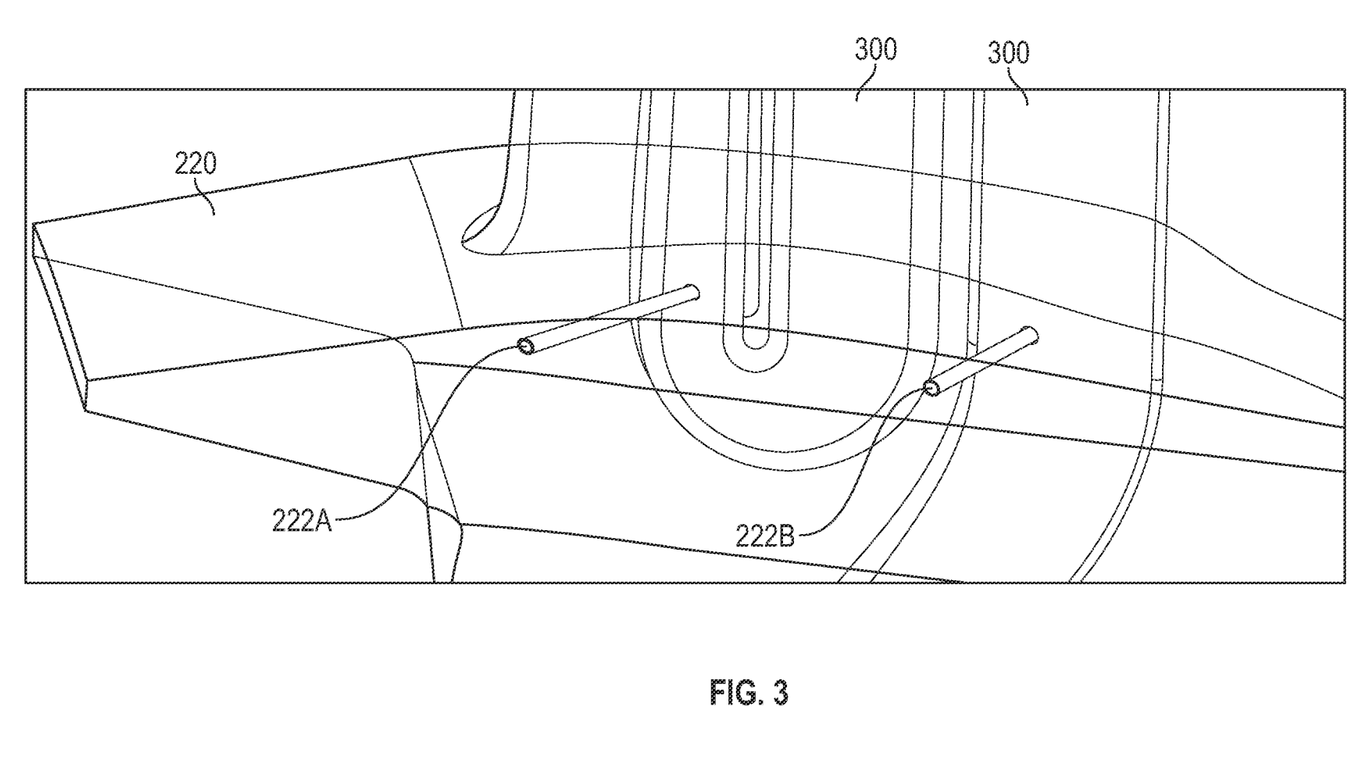
FIG. 3 illustrates a transparent view of a portion of a turbine blade, according to an embodiment.

FIG. 3 illustrates a transparent view of a portion of turbine blade 200, according to an embodiment. As illustrated, each cooling hole 222 comprises a linear passage that provides fluid communication between an external surface of platform 220 and one or more internal cooling passages 300 that provide a main flow of cooling air through turbine blade 200. For example, cooling hole 222A comprises a linear pathway from internal cooling passage(s) 300 to a first region of an external side surface of platform 220, and cooling hole 222B comprises a linear pathway from internal cooling passage(s) 300 to a second region of the external side surface of platform 220 (e.g., aft of the first region). The cooling air may be air from compressor 120 that bypasses combustor 130. The cooling air may be provided to internal cooling passage(s) 300 in each turbine blade 200 through an opening in root 210 of each turbine blade 200 that is in fluid communication with a cooling air circuit. Internal cooling passage(s) 300 may extend from root 210, through platform 220, and into airfoil 230.

Each cooling hole 222 may be milled or drilled (e.g., using electrical discharge machining (EDM)) through a side surface of platform 220, within a medial plane of platform 220, towards an internal cooling passage 300, until a pathway is made between the exterior of platform 220 and internal cooling passage 300. Alternatively, cooling holes 222 could be created during casting of turbine blade 200. Cooling holes 222 may be created during initial manufacture of turbine blade 200 or after manufacture of turbine blade 200 (e.g., as a retrofit). Each cooling hole 222 may have a circular cross-section. Alternatively, each cooling hole 222 may have a non-circular cross-section (e.g., semi-circular, crescent, triangular, rectangular, etc.).

In an embodiment, cooling holes 222 are strictly linear (i.e., straight from a proximal end to a distal end) from the external surface of platform 220 to internal cooling passage 300, to provide a straight pathway with no elbows or branches. A non-linear pathway may render cooling holes 222 ineffective. Specifically, a high internal Mach number is generally required to generate the internal heat transfer coefficients (HTCs) necessary for effective cooling. The greater the Mach number within cooling holes 222, the more effective the cooling. In an embodiment, each cooling holes 222 provides a Mach number of at least 0.8. However, it should be understood that cooling holes 222 may be configured to achieve any suitable internal Mach number, including a Mach number that is greater than or less than 0.8.

While the Mach number of cooling holes 222 is relatively high, the Mach number of the supply passage, such as internal cooling passages 300, may be less. For example, in an embodiment, the Mach number of internal cooling passages 300 is less than 0.35. In general, the lower the Mach number of the supply passage, the more effective the cooling is in cooling holes 222. However, in an alternative embodiment, cooling holes 222 may be curved, rather than strictly linear, in order to satisfy heat transfer requirements, structural requirements, available geometry of platform 220, and/or the like.

In an embodiment, cooling holes 222 may be cast, which may require a draft or taper. Additionally or alternatively, cooling holes 222 may have a radius or fillet added to one or both ends to reduce local stresses. Additionally or alternatively, cooling holes 222 may join holes of larger cross-sectional areas and/or of the same or different shape (e.g., rectangular), but of shallower depth, on one or both ends.

Figure 4:
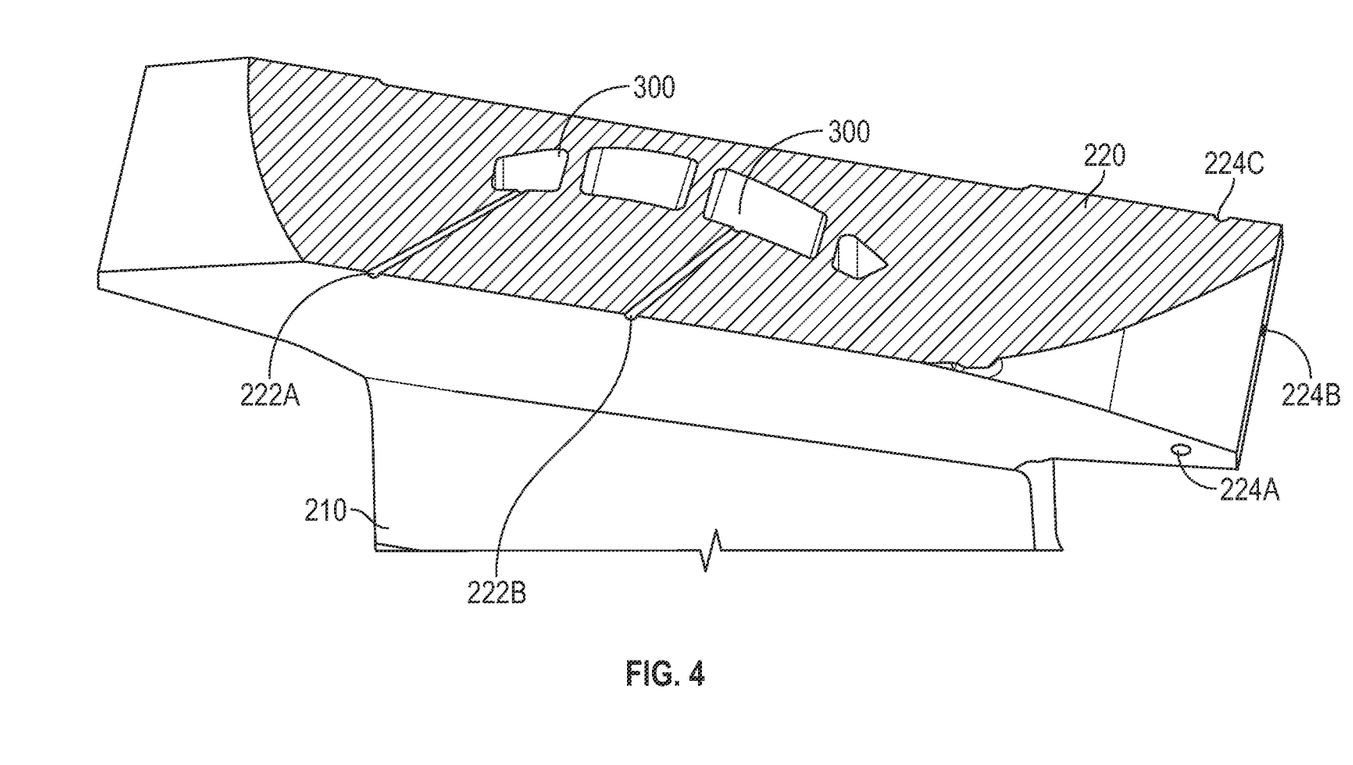
FIG. 4 illustrates a top perspective cross-sectional view in the medial plane of a platform of a turbine blade, according to an embodiment.

FIG. 4 illustrates a top perspective cross-sectional view in the medial plane of platform 220, according to an embodiment. As illustrated, each cooling hole 222 extends outward from an internal cooling passage 300 towards an external surface of platform 220. Each cooling hole 222 may extend from different sections of internal cooling passages 300, or from the same section of internal cooling passages 300. In addition, in embodiments in which there are a plurality of cooling holes 222, cooling holes 222 may be non-parallel. Alternatively, cooling holes 222 may be parallel to each other, or a subset of cooling holes 222 may be parallel while another subset of cooling holes 222 is not parallel.

Figure 5:
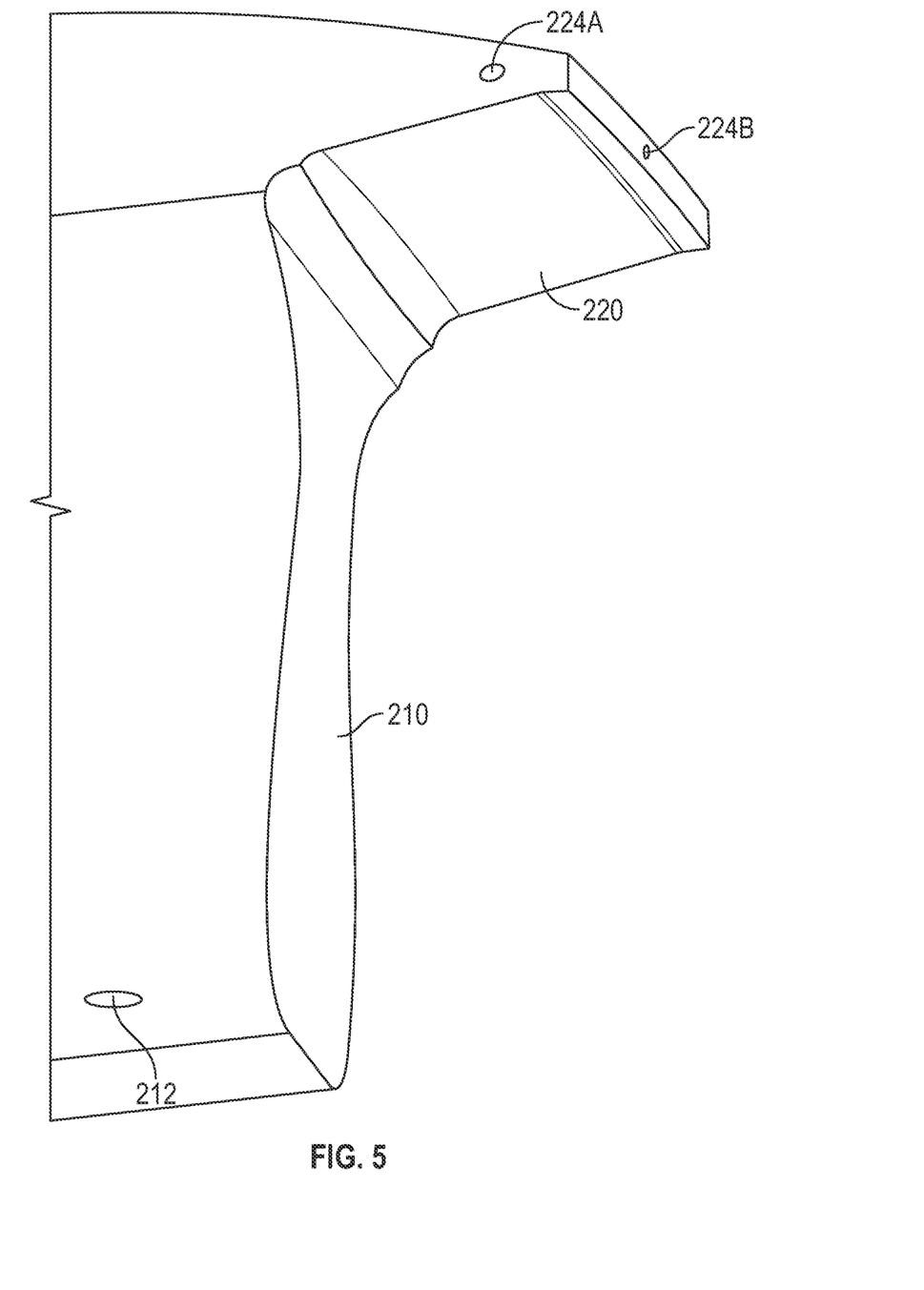
FIG. 5 illustrates a bottom perspective view of a portion of the trailing edge region of a turbine blade, according to an embodiment.

FIG. 5 illustrates a bottom perspective view of a portion of the trailing edge region of turbine blade 200, according to an embodiment. As illustrated, the bottom surface of root 210 may comprise a dedicated cooling inlet hole 212 that is in fluid communication with one or more cooling holes 224 in platform 220. Cooling air may be supplied (e.g., from a passage within a turbine rotor disk to which turbine blade 200 is affixed via root 210) through inlet hole 212 to feed cooling hole(s) 224. This cooling air may be supplied to inlet hole 212 by the same cooling air circuit that supplies internal cooling passage(s) 300. As discussed above, the cooling air circuit may supply air from compressor 120 that bypasses combustor 130.

Figure 6:
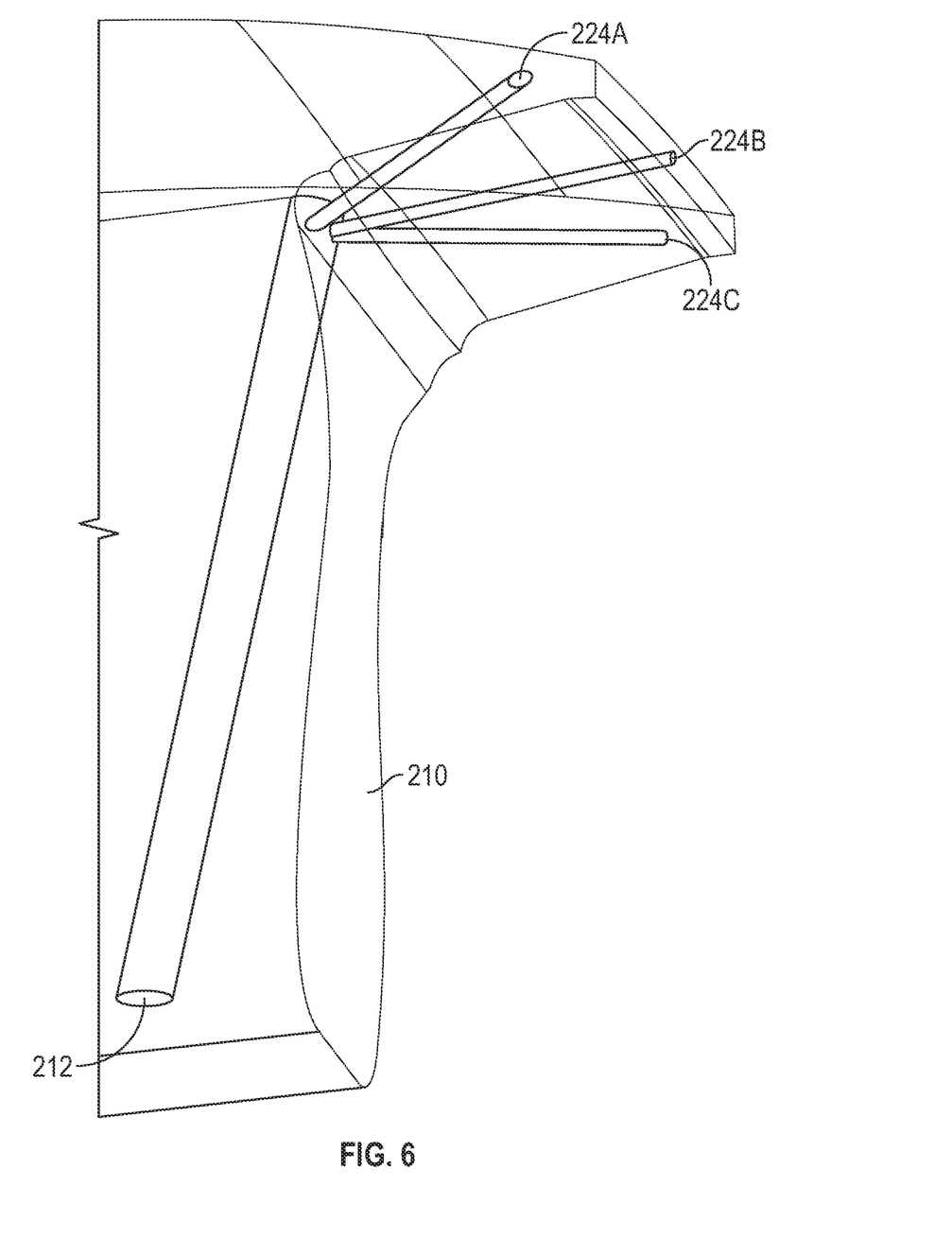
FIG. 6 illustrates a transparent bottom perspective view of a portion of the trailing edge region of a turbine blade, according to an embodiment.
Figure 7:
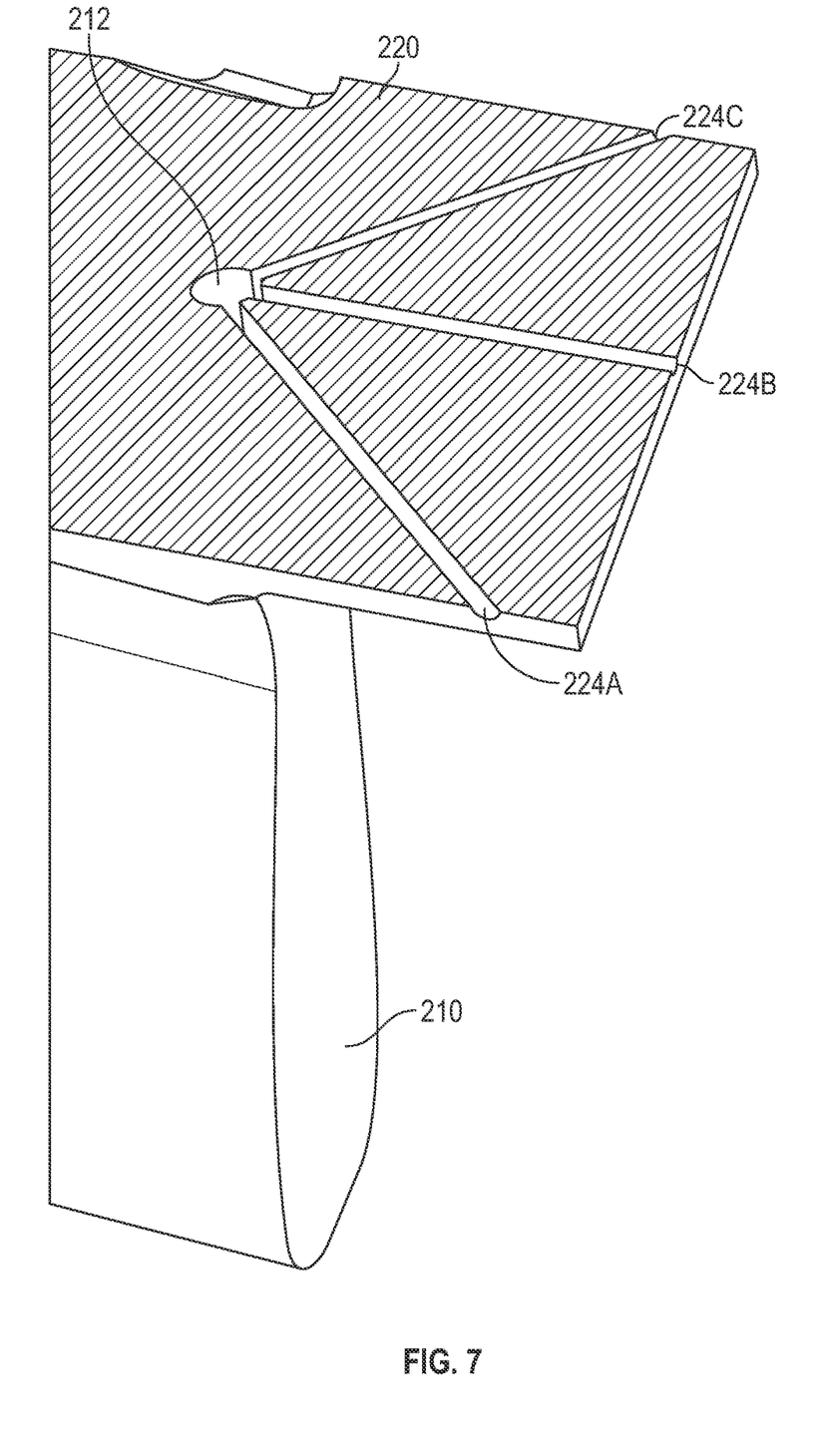
FIG. 7 illustrates a top perspective cross-sectional view of a portion of the trailing edge region of a turbine blade, according to an embodiment.

FIG. 6 illustrates a transparent bottom perspective view of a portion of the trailing edge region of turbine blade 200, and FIG. 7 illustrates a top perspective cross-sectional view of a portion of the trailing edge region of turbine blade 200, according to an embodiment. As illustrated, dedicated cooling inlet hole 212 extends through root 210 and into platform 220 to feed cooling holes 224 in platform 220. Each cooling hole 224 extends radially from inlet hole 212. In the illustrated embodiment, a first cooling hole 224A extends radially from inlet hole 212 and exits on the pressure-side surface of platform 220 in the trailing edge region of platform 220, a second cooling hole 224B extends radially from inlet hole 212 and exits on the trailing edge surface of platform 220, and a third cooling hole 224C extends radially from inlet hole 212 and exits on the suction-side surface of platform 220 in the trailing edge region of platform 220. In an alternative embodiment, cooling holes 224 may be in fluid communication with internal cooling passage(s) 300, instead of dedicated cooling inlet hole 212, or inlet hole 212 may be part or extension of internal cooling passage(s) 300.

In general, with the exception of positioning, inlet hole 212 and each cooling hole 224 may be similar or identical to cooling holes 222. Thus, any description of cooling hole 222 may be equally applied to inlet hole 212 and cooling holes 224, and vice versa. It should be understood that cooling holes 222 and 224, as well as inlet hole 212, may be of any suitable diameter. For example, in one particular implementation, the diameter of each cooling hole 222 and 224 was 0.030 inches, and the diameter of inlet hole 212 was 0.1 inches.

Each cooling hole 224 and inlet hole 212 may be milled or drilled (e.g., using electrical discharge machining (EDM)) as a blind hole to a specific depth. For example, inlet hole 212 may be drilled from root 210 to a specific point in platform 220, and each cooling hole 224 may then be drilled from a side surface of platform 220 to intersect inlet hole 212. Alternatively, inlet hole 212 and/or cooling holes 224 may be created during casting of turbine blade 200. Inlet hole 212 and/or cooling holes 224 may be created during manufacture of turbine blade 200 or after manufacture of turbine blade 200 (e.g., as a retrofit). Each inlet hole 212 and/or cooling hole 224 may have a circular cross-section. Alternatively, each inlet hole 212 and/or cooling hole 224 may have a non-circular cross-section (e.g., semi-circular, crescent, triangular, rectangular, etc.).

Figure 8:
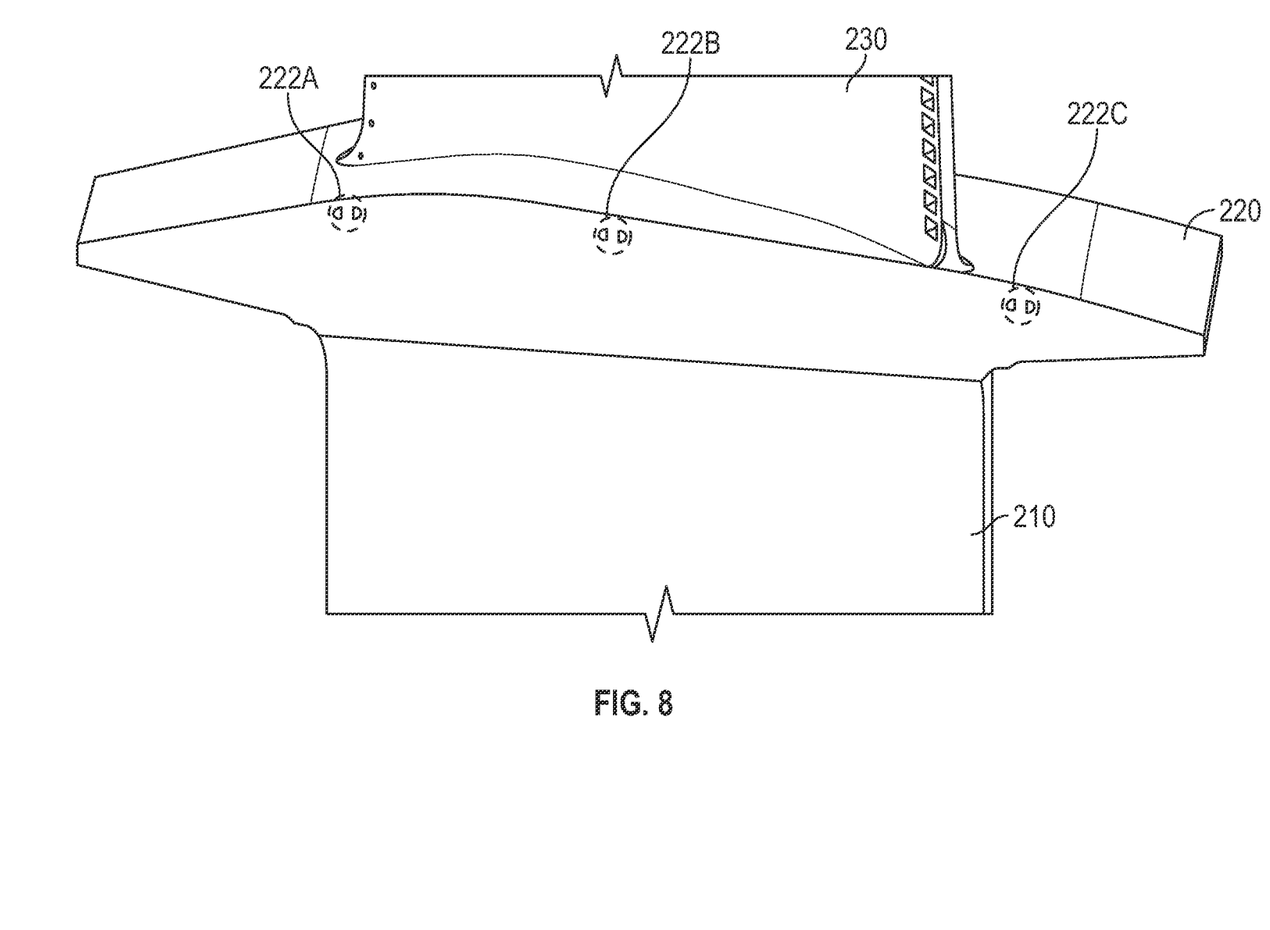
FIG. 8 illustrates a perspective view of a portion of a turbine blade, according to an embodiment.
Figure 9:
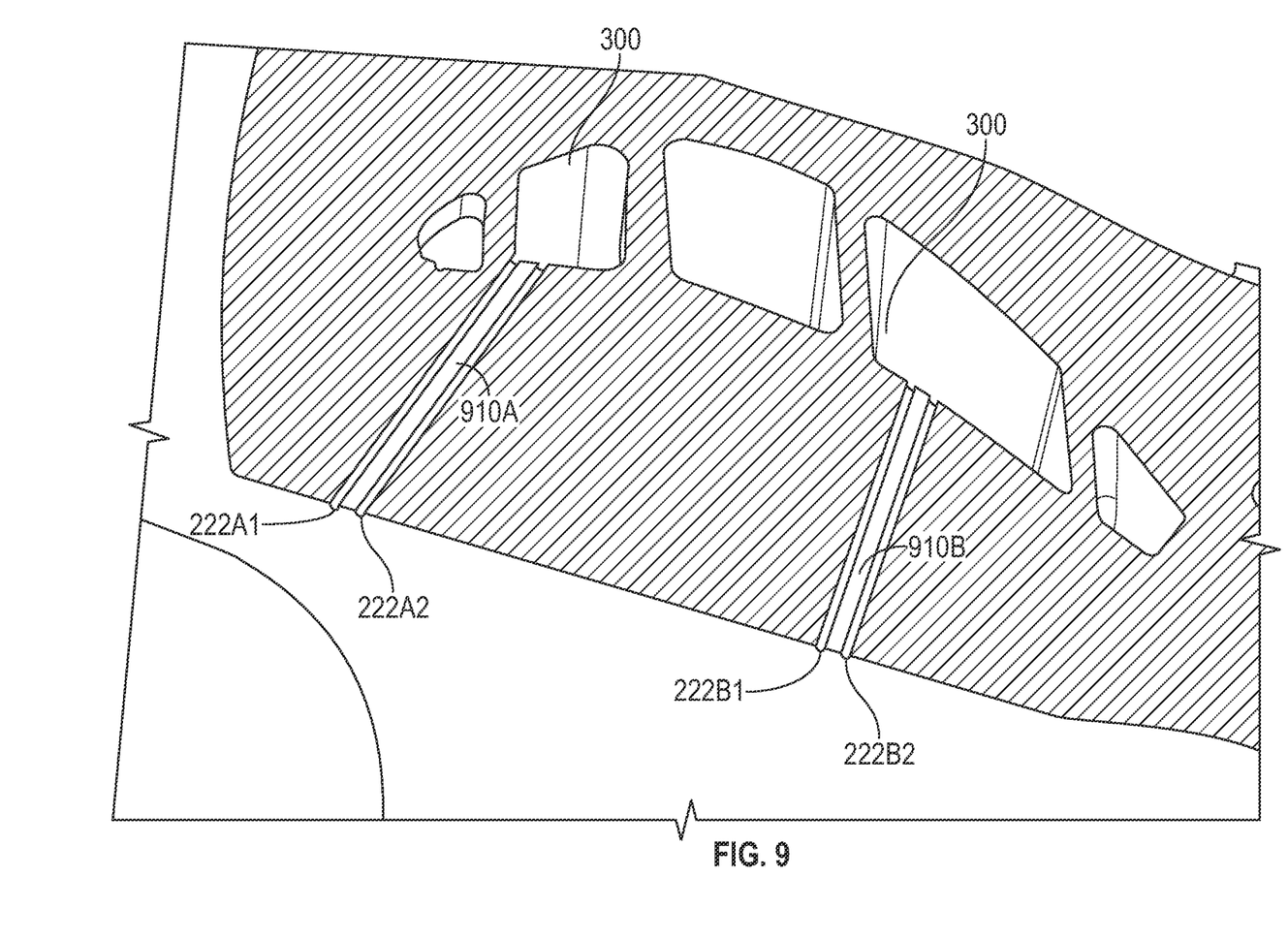
FIG. 9 illustrates a top perspective cross-sectional view of a portion of a platform of a turbine blade, according to an embodiment.

FIG. 8 illustrates a perspective view of a portion of turbine blade 200, and FIG. 9 illustrates a top perspective cross-sectional view of a portion of platform 220, according to a second embodiment. This second embodiment only differs from the first embodiment with respect to the configuration of each cooling hole 222. In particular, each cooling hole 222 in the second embodiment comprises two separate and distinct semi-circular or half-moon shaped holes. Every other feature of this alternative embodiment may be similar or identical to the previously described embodiment.

As illustrated, each cooling hole 222 comprises two parallel passages, which are separated from each other by a ridge or fin 910. For example, cooling hole 222A comprises two passages 222A1 and 222A2 separated by fin 910A, and cooling hole 222B comprises two passages 222B1 and 222B2 separated by fin 910B. Fin 910 may have a rectangular cross-section. Thus, the two cooling holes 222 and two passages 310 on the pressure-side surface in the first embodiment are replaced with four cooling holes on the pressure-side surface in the second embodiment. Collectively, each pair of passages may have an equivalent flow area to cooling hole 222 in the first embodiment. For example, passages 222A1 and 222A2 in the second embodiment may have an equivalent flow area to cooling hole 222A in the first embodiment, and passages 222B1 and 222B2 in the second embodiment may have an equivalent flow area to cooling hole 222B in the first embodiment.

Each pair of passages (e.g., 222A1 with 222A2, or 222B1 with 222B2) may be thought of as a cooling hole 222 that has been split down its center with the resulting portions separated by a fin 910. Within each pair of passages, the passages (e.g., 222A1 with 222A2, or 222B1 with 222B2) may be (but do not have to be) parallel to each other. In addition, one pair of passages may be (but do not have to be) non-parallel with another pair of passages. For example, the pair of passages 222A1 and 222A2 may be, but do not have to be, parallel with the pair of passages 222B1 and 222B2.

The second embodiment is distinctive from the first embodiment in both appearance and its utilization as a gas/gas heat exchanger. Analytical assessments have shown that the combination of the two semi-circular-shaped passages (e.g., 222A1 with 222A2, or 222B1 with 222B2) and fin 910 results in an equivalent internal conductance enhancement of approximately 80% over the first embodiment. This implies an enhancement to the internal heat transfer coefficient of 1.8, compared to 2.3 for turbulators and 1.0 for the first embodiment. However, it should be understood that these are examples of analytical results, and that embodiments are not limited to any particular result.

One or more, including potentially all, of holes 222 (e.g., including 222A1, 222A2, 222B1, and 222B2 in the second embodiment) and 224 may comprise a thermal barrier coating on the top surface of platform 220. The thermal barrier coating may extend over the top surface of at least the portion(s) of platform 220 that contain cooling holes 222 and 224. For example, if cooling hole(s) 222 are in the middle region of platform 220 and cooling hole(s) 224 are in the trailing edge region of platform 220, the thermal barrier coating may extend over the top surface of at least the middle and trailing edge regions of platform 220. It should be understood that, in this example, the thermal barrier coating may also extend over the leading edge region or, alternatively, may not extend over the leading edge region. The thermal barrier coatings set up very large heat fluxes. This can result in large temperature gradients across the thermal barrier coatings, which can increase the cooling effects of holes 222 and 224 and further reduce the temperature of platform 220. However, it should be understood that the thermal barrier coating is not necessary, and that holes 222 and 224 will still function to cool platform 220 without any thermal barrier coating. In particular, in the second embodiment, the internal HTC enhancement of 1.8 may render thermal barrier coatings superfluous.

INDUSTRIAL APPLICABILITY

The embodiments described herein can be used to extend the life of platforms 220 in turbine blades 200 in a turbine 140 (e.g., in a gas turbine engine 100) by minimizing local metal temperatures (e.g., to reduce oxidation concerns and improve material properties) and minimizing temperature gradients (e.g., to reduce thermal stresses). For example, each hole 222 and/or 224 becomes a sink that extracts heat from regions of platform 220 surrounding holes 222 and/or 224. The regions in platform 220 that are cooled by holes 222 and/or 224 may extend up to approximately twenty (20) hydraulic diameters from the center of the holes 222 and/or 224. In addition, as the coolant temperature inevitably rises during the cooling event, the metal temperature distribution in platform 220 will grow warmer as the cooling flow progresses towards an exit (e.g., where cooling holes 222 and/or 224 meet the external surface of platform 220).

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of turbine blade, turbine, or gas turbine engine. Hence, although the present embodiments are, for convenience of explanation, depicted and described as being implemented in a gas turbine engine, it will be appreciated that it can be implemented in various other types of turbomachinery and machines with turbine blades, and in various other systems and environments. Furthermore, there is no intention to be bound by any theory presented in any preceding section. It is also understood that the illustrations may include exaggerated dimensions and graphical representation to better illustrate the referenced items shown, and are not consider limiting unless expressly stated as such.

What is claimed is:

1. A turbine blade comprising:
   an airfoil;
   a root;
   a platform between the airfoil and the root, wherein the platform has a leading edge region that extends upstream from the airfoil, a middle region from which the airfoil extends, and a trailing edge region that extends downstream from the airfoil; and
   one or more internal cooling passages extending from the root, through the platform, and into the airfoil;
   wherein the platform comprises at least one first cooling hole in a side surface of the leading edge region or middle region of the platform, wherein the at least one first cooling hole is in fluid communication with the one or more internal cooling passages, and wherein the at least one first cooling hole is linear,
   wherein the platform comprises at least three second cooling holes in the trailing edge region of the platform, wherein the at least three second cooling holes are in fluid communication with a supply passage, and
   wherein a first one of the at least three second cooling holes is in a pressure-side surface of the trailing edge region of the platform, a second one of the at least three second cooling holes is in a trailing edge surface of the trailing edge region of the platform, and a third one of the at least three second cooling holes is in a suction-side surface of the trailing edge region of the platform.

2. The turbine blade of claim 1, wherein the supply passage comprises a dedicated inlet hole extending from the root to the platform.

3. The turbine blade of claim 1, wherein the one or more internal cooling passages comprise the supply passage.

4. The turbine blade of claim 1, wherein the at least one first cooling hole comprises two first cooling holes, and wherein each of the two first cooling holes is in fluid communication with the one or more internal cooling passages.

5. The turbine blade of claim 4, where the two first cooling holes are not parallel to each other.

6. The turbine blade of claim 4, wherein the two first cooling holes have a semi-circular cross-section.

7. The turbine blade of claim 4, wherein the two first cooling holes are separated from each other by a fin.

8. The turbine blade of claim 7, wherein the fin has a rectangular cross-section.

9. The turbine blade of claim 7, wherein the at least one first cooling hole comprises at least four first cooling holes arranged in two pairs, wherein each pair of first cooling holes is in fluid communication with the one or more internal cooling passages, and wherein the cooling holes in each respective pair of cooling holes are parallel to each other.

10. The turbine blade of claim 9, wherein the cooling holes in a first pair of cooling holes are not parallel to the cooling holes in a second pair of cooling holes.

11. The turbine blade of claim 1, wherein each of the at least three second cooling holes is in fluid communication with the supply passage via a respective branch passage that branches from the supply passage.

12. The turbine blade of claim 11, wherein each of the branch passages branch from the supply passage within the trailing edge region of the platform.

13. The turbine blade of claim 11, wherein each of the branch passages is linear.

14. The turbine blade of claim 1, wherein at least a portion of the top surface of the platform comprises a thermal barrier coating.

15. A turbine rotor assembly comprising a plurality of the turbine blade of claim 1 arranged around a turbine rotor disk.

16. A gas turbine engine comprising:
    a compressor;
    a combustor downstream from the compressor; and
    a turbine downstream from the combustor, wherein the turbine comprises at least one of the turbine rotor assembly of claim 15.

17. The gas turbine engine of claim 16, further comprising a cooling air circuit that bypasses the combustor to supply air from the compressor to the one or more internal cooling passages in each turbine blade.

18. A turbine blade comprising:
    an airfoil;
    a root;
    a platform between the airfoil and the root, wherein the platform has a leading edge region that extends upstream from the airfoil, a middle region from which the airfoil extends, and a trailing edge region that extends downstream from the airfoil; and
    one or more internal cooling passages extending from the root, through the platform, and into the airfoil;
    wherein the platform comprises at least two linear first cooling holes in a pressure-side surface of the middle region of the platform, wherein each of the at least two linear first cooling holes is in fluid communication with the one or more internal cooling passages, and
    wherein the platform comprises at least three linear second cooling holes in the trailing edge region of the platform, wherein each of the at least three linear second cooling holes is in fluid communication with a supply passage extending from the root to the platform, wherein a first one of the at least three linear second cooling holes is in the pressure-side surface of the trailing edge region of the platform, wherein a second one of the at least three linear second cooling holes is in a trailing edge surface of the trailing edge region of the platform, and wherein a third one of the at least three linear second cooling holes is in a suction-side surface of the trailing edge region of the platform.

19. A turbine blade comprising:
    an airfoil;
    a root;
    a platform between the airfoil and the root, wherein the platform has a leading edge region that extends upstream from the airfoil, a middle region from which the airfoil extends, and a trailing edge region that extends downstream from the airfoil; and
    one or more internal cooling passages extending from the root, through the platform, and into the airfoil;
    wherein the platform comprises at least one first cooling hole in a pressure-side surface of the leading edge region or middle region of the platform, wherein the at least one first cooling hole is in fluid communication with the one or more internal cooling passages, and wherein the at least one first cooling hole is linear, wherein the platform comprises at least three second cooling holes in the trailing edge region of the platform, wherein the at least three second cooling holes are in fluid communication with a supply passage, and wherein a first one of the at least three second cooling holes is in a pressure-side surface of the trailing edge region of the platform, a second one of the at least three second cooling holes is in a trailing edge surface of the trailing edge region of the platform, and a third one of the at least three second cooling holes is in a suction-side surface of the trailing edge region of the platform.

\* \* \* \* \*